United States Patent [19]

Allen et al.

[11] 4,365,268

[45] Dec. 21, 1982

[54] VIDEO PLANTER GUIDANCE AID

[75] Inventors: David T. Allen; Keith R. Baker, both of Waterloo, Iowa

[73] Assignee: Deere & Company, Moline, Ill.

[21] Appl. No.: 186,458

[22] Filed: Sep. 12, 1980

[51] Int. Cl.³ .............................................. H04N 7/18
[52] U.S. Cl. ...................................... 358/93; 358/108; 358/210; 172/430; 294/66 A
[58] Field of Search ................. 358/108, 93, 101, 210; 294/66 A; 172/430

[56] References Cited

U.S. PATENT DOCUMENTS

| | | | |
|---|---|---|---|
| 769,916 | 9/1904 | Pfatisher | 290/17 |
| 2,232,982 | 2/1941 | Tank | 114/23 |
| 3,101,175 | 8/1963 | Brown, Jr. | 358/101 |
| 3,144,146 | 8/1964 | Strickland, Jr. | 414/690 |
| 3,166,204 | 1/1965 | Buhr | 214/42 |
| 3,431,475 | 3/1969 | Wesner | 318/624 |
| 3,662,243 | 5/1972 | Cavil et al. | 318/588 |
| 3,689,695 | 9/1972 | Rosenfield et al. | 358/210 |
| 3,786,945 | 1/1974 | Symonds | 414/335 |
| 3,932,028 | 1/1976 | Klingler | 350/307 |
| 4,042,132 | 8/1977 | Bohman et al. | 414/338 |
| 4,180,133 | 12/1979 | Collogan et al. | 172/26 |
| 4,211,921 | 7/1980 | Kanetou et al. | 250/201 |
| 4,288,814 | 9/1981 | Talley et al. | 358/108 |

Primary Examiner—Robert L. Griffin
Assistant Examiner—Edward L. Coles

[57] ABSTRACT

A tractor-planter guidance aid system including a TV camera mounted on a servo motor at an end of the planter to view a mark in the terrain created by a marker mounted on the other end of the planter. Angle sensors send signals to a control circuit, these signals representing the angle between the tractor and the planter and between the camera and the planter. The control circuit cooperates with the servo motor to maintain the camera in parallel alignment with the tractor. A TV monitor displays the image detected by the camera to the operator of the tractor.

20 Claims, 5 Drawing Figures

4,365,268

VIDEO PLANTER GUIDANCE AID

BACKGROUND OF THE INVENTION

This invention relates to a video guidance aid for assisting the operator to steer or guide a tractor towing a wide implement, such as a planter.

With conventional planter guidance systems, a marker on the end of a lengthy boom, which is attached to an end of the planter, creates a mark in the ground. The operator then steers the tractor on the next pass so as to straddle the mark made on the previous pass. This requires that the length of the boom be one-half the total width of the planter. This long boom adds undesirable weight to the planter. This boom must be retractably or pivotally mounted on the planter to provide clearance for the planter during transportation. To solve this problem, guidance aiding systems have been proposed in which a TV camera is rigidly mounted on an end of a planter so that an image of a mark, created in the soil during a previous pass of the planter, may be viewed by the tractor operator from a TV monitor mounted in the cab of the tractor. Such guidance aiding systems have suffered from the natural tendency of the vehicle operator to over-steer when relying on the image displayed on the TV monitor. Part of this over-steering problem was caused by time delays between steering changes of the tractor and the resulting pivoting or turning of the planter. Having the TV camera fixed, rather than pivotal, relative to the planter also contributed to the over-steering.

SUMMARY OF THE INVENTION

An advantage of the present invention is that it provides a vehicle guidance aid which may be used with only a short and lightweight marker boom.

Another advantage of the present invention is that it provides a video guidance aid which reduces the tendency of the vehicle operator to over-steer when depending upon the guidance aid to steer a tractor towing an implement.

Another advantage of the present invention is that it eliminates error-causing time delays between steering changes of the tractor and direction changes of the video camera mounted on the implement.

A further advantage of the present invention is that it provides automatic control and servo mechanisms which assure that the video camera is aiming in a direction parallel to the direction in which the tractor is travelling.

These advantages are achieved, according to the present invention, in that it provides an improved video tractor implement guidance aid system. The system includes a video camera, pivotally mounted near an end of the implement, for viewing a mark produced in the terrain by a previous pass of the implement. A first angle sensor, connected between the hitch and the implement, generates a signal corresponding to the angle between the tractor and the implement. A feedback angle sensor, connected between the video camera and the implement, generates a feedback signal corresponding to the angle between the camera and the implement. These signals are compared and a servo amplifier generates an error signal corresponding to the difference therebetween. A servo motor, connected to the video camera, adjusts the angle of the camera in response to the error signal so that the camera is always aiming in a direction parallel to the direction in which the tractor is travelling.

DETAILED DESCRIPTION OF THE INVENTION

Figure 1:
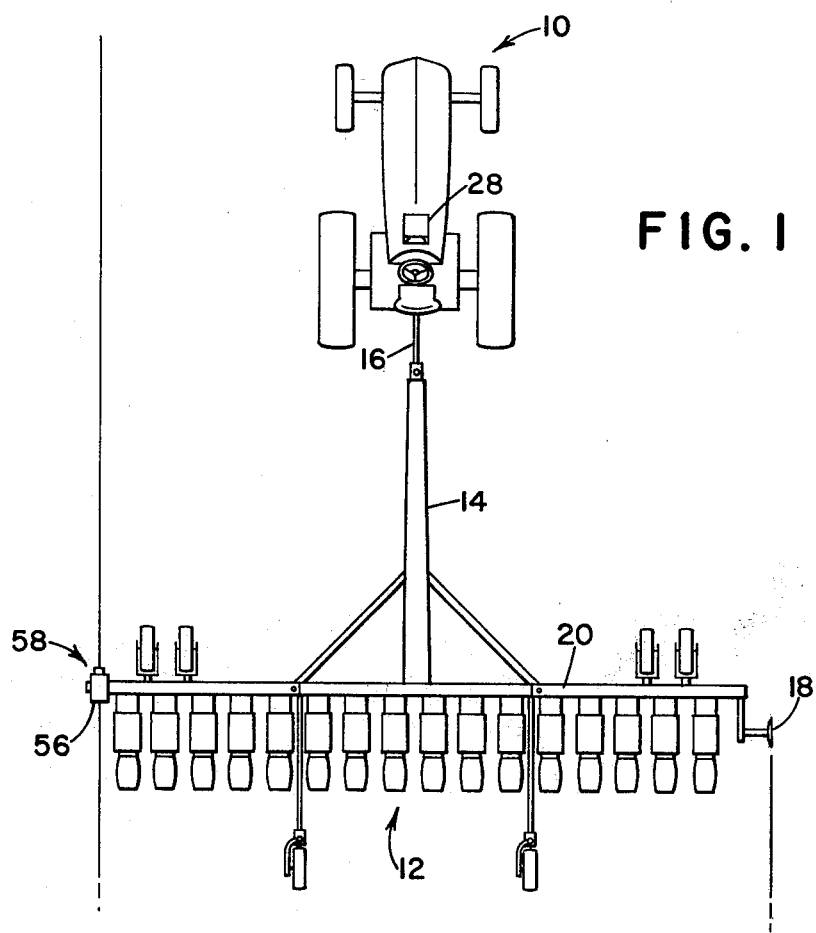
FIG. 1 is a simplified schematic view of a tractor and implement combination with applicant's guidance aid system.

A tractor 10 pulls an agricultural implement, such as a planter 12 with a hitch 14, via a drawbar 16. A conventional type marker 18 is mounted via a short boom on one end of the planter frame 20. A hitch angle sensing assembly 22 is coupled between the hitch 14 and the drawbar 16.

Figure 2:
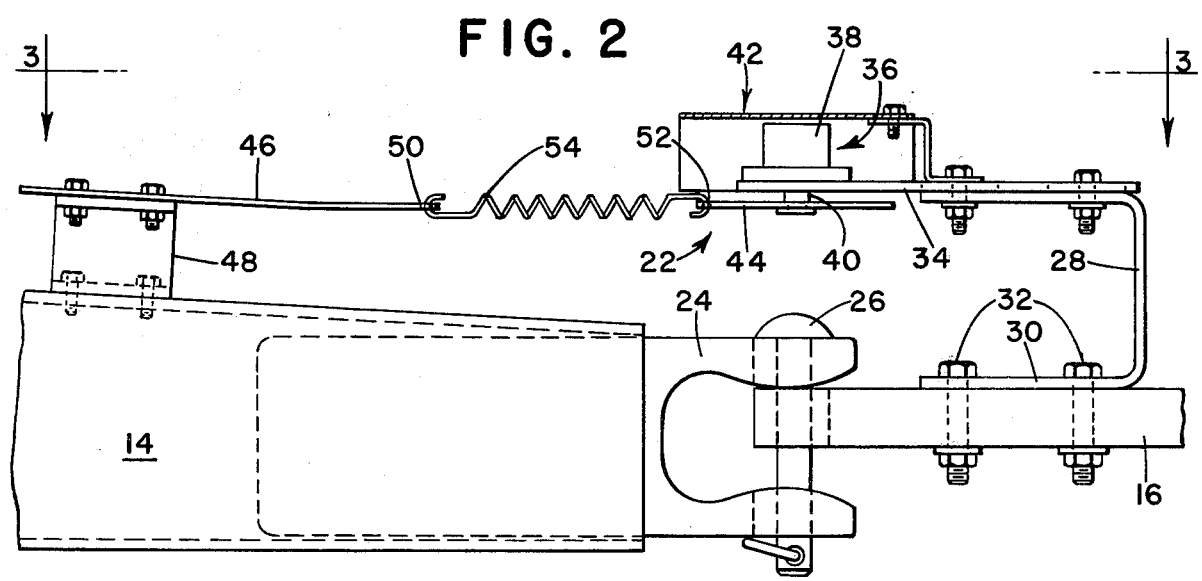
FIG. 2 is a side view of the tractor drawbar and hitch with applicant's angle sensor.
Figure 3:
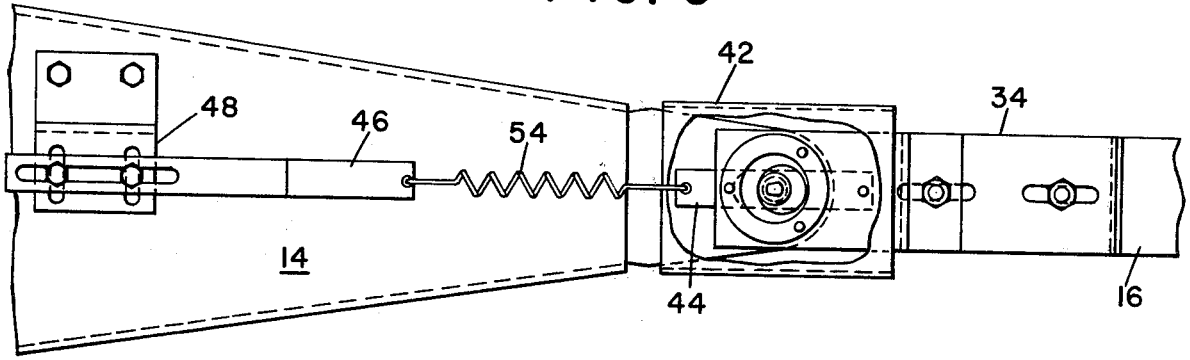
FIG. 3 is a view in the direction of arrows 3—3 of FIG. 2.

Referring now to FIGS. 2 and 3, the planter hitch 14 includes a clevis 24 on the end thereof for receiving an end of the drawbar 16. A hitch pin 26 pivotally couples the drawbar to the clevis 24 so that the planter hitch 14 may pivot with respect to the tractor 10 about the axis of the pin 26. Hitch angle sensing assembly 22 includes a "C"-shaped bracket 28 with a lower end 30 fixed to the drawbar 16 via bolts 32. Upper bracket 34 is attached to the upper end of bracket 28 and supports a potentiometer type transducer 36. The potentiometer housing 38 is supported on the upper surface of bracket piece 34 while the potentiometer shaft 40 extends through an aperture in bracket piece 34. The axis of shaft 40 is in colinear alignment with the axis of pin 26. A protective cover 42, also attached to upper bracket piece 34, extends over and around the potentiometer 36 and protects it from the environment. A radially extending arm 44 is fixed to an end of shaft 40 so that shaft 40 and arm 44 rotate together. A rigid arm 46 is fixed to the planter hitch 14 via a bracket 48. The arm 46 extends above the hitch 14 and terminates at an end 50 spaced apart from an end 52 of radial arm 44. A spring 54 interconnects ends 50 and 52 of arms 46 and 44, respectively, and is biased to urge the two ends together and to maintain arm 44 aligned with the longitudinal axis of the hitch 14.

Figure 4:
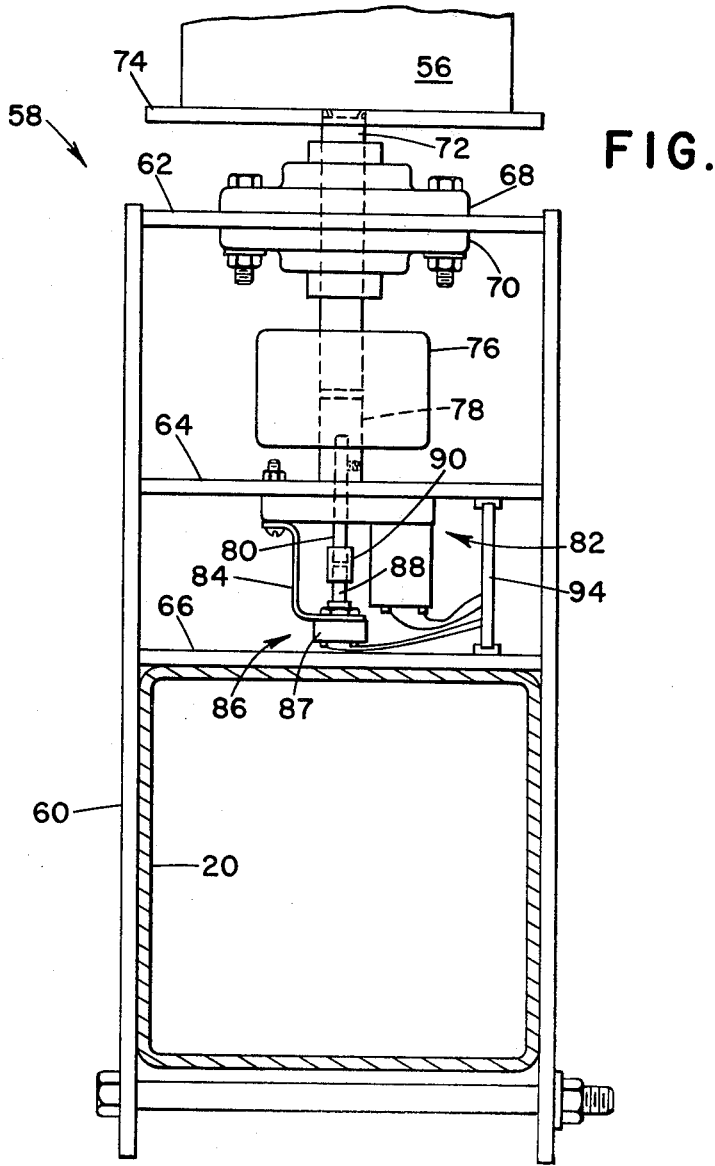
FIG. 4 is a view of the camera mount portion of applicant's invention.

A TV camera 56 is pivotally mounted via camera mount assembly 58 on the end of planter frame 20 opposite the end of the planter frame 20 which supports the marker 18. Referring now to FIG. 4, camera mount assembly 58 includes a frame 60 bolted to planter frame 20 and extending upwardly therefrom. The frame 60 includes upper, middle and lower cross-members 62, 64 and 66, respectively. Upper member 62 supports a pair of bearing assemblies 68 and 70 on either side thereof. The bearings 68 and 70 rotatably receive a shaft 72 extending from camera platform 74. A torque limiting slip coupling 76 couples the lower end of shaft 72 to an upper end of shaft 78. Shaft 78 is connected via a set screw to the drive shaft 80 which extends from a D.C. gear motor or servo motor 82. The housing of gear motor 82 is bolted onto the lower surface of middle cross-member 64. A bracket 84 is bolted to cross-member 64 and to the gear motor housing. The lower end of bracket 84 carries a potentiometer transducer 86 identical to transducer 36 previously described. The shaft 88 of potentiometer 86 is connected to the drive shaft 80 of gear motor 82 via a bushing 90 and a pair of set screws. The lower cross-member 66 rests upon the upper surface of the planter frame 20.

Figure 5:
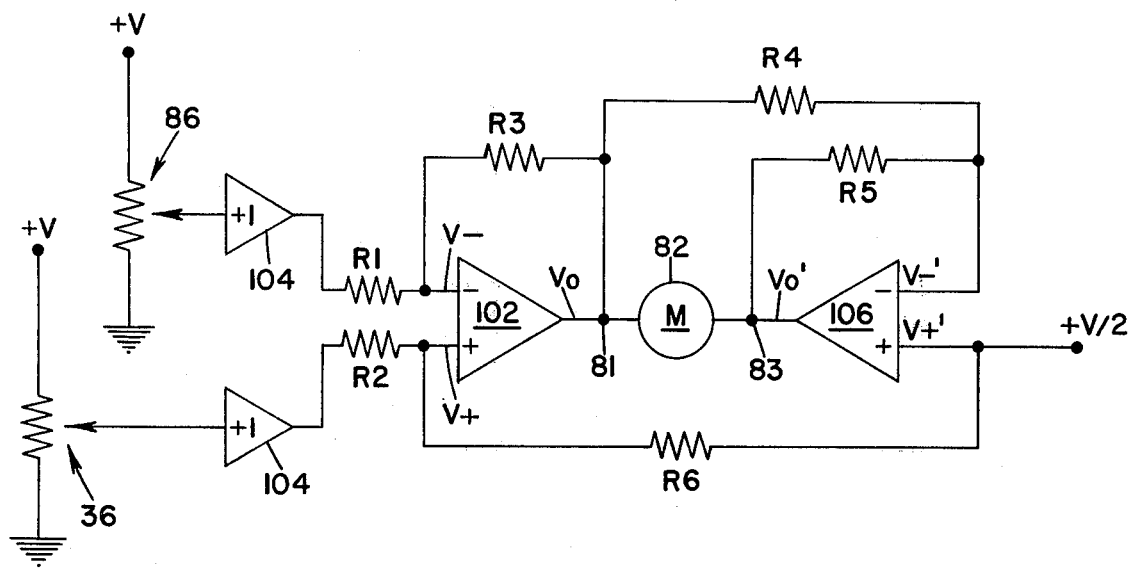
FIG. 5 is a circuit diagram of a control circuit for use in applicant's invention.

A circuit 100, for controlling the aim of camera 56, is shown in FIG. 5. The fixed resistances of potentiometers 36 and 86 are connected between ground and a +12 volt nominal D.C. voltage supply (+V). The tap terminal of potentiometer 36 is connected to the (+) input of differential amplifier 102 via unity gain buffer amplifier 104 and 1 kohm resistor R1. The tap terminal of potentiometer 86 is coupled to the (−) terminal of differential amplifier 102 via an identical buffer amplifier 104 and another 1 kohm resistor R2. The output of amplifier 102 is coupled to its (−) input via a 10 kohm feedback resistor R3. the output of amplifier 102 is also coupled to terminal 81 of servo motor 82 and to the (−) terminal of differential amplifier 106 via 10 kohm resistor R4. The output of differential amplifier 106 is coupled to terminal 83 of servo motor 82 and to its (−) input via 10 kohm resistor R5. A 10 kohm resistor R6 is coupled between the (+) inputs of both differential amplifiers 102 and 106. Finally, the (+) input of amplifier 106 is coupled to a voltage source of ½ the voltage of supply +V. With this circuit, the voltage Vo at the output of amplifier 102 and at terminal 81 is defined by the equation:

$$Vo = (R3/R1)(V+ - V-) + V/2. \quad (1)$$

Similarly, the voltage Vo' at the output of amplifier 106 and at terminal 83 is proportional to:

$$(V+' - V-') + V/2. \quad (2)$$

It should be noted that these component values are given merely for purposes of illustration and in no way limit the scope of applicant's invention.

Mode of Operation

A steady state condition may be defined wherein the camera 56 is aimed parallel to the longitudinal axis of the tractor 10 and wherein no steering changes are made. In this condition, potentiometers 36 and 86 are adjusted so that the voltages at their tap terminals are equalized, as are voltages V+ and V− and the (+) and (−) inputs, respectively, of differential amplifier 102. Also, in this case, no current flows through the resistors of circuit 100 and thus, since there is no voltage drop across these resistances, the voltage at the (−) input of amplifier 106 is also +V/2. The (+) input of amplifier 106 is coupled directly to +V/2, as described previously. As a result, Vo' (at terminal 83 and at the output of amplifier 106) is also +V/2, as indicated by equation (2). Since the voltages at both terminals 81 and 83 of servo motor 82 are equalized, no current flows through motor 82 and no change is made in the aim of camera 56 connected to potentiometer 86. As a result, this steady state condition is maintained until a steering change is made which changes the angle between the tractor 10 and the planter 12.

Now, if a steering change is made, then the tractor 10 turns relative to planter 12 and the angle between the drawbar 16 and the planter hitch 14 changes accordingly. This causes the shaft 40 of potentiometer 36 to rotate relative to its housing 38, thus changing the voltage at its tap terminal. For example, the potentiometer 36 can be connected so that for a right-hand turn of the tractor, (viewing FIG. 1), the voltage increases at the tap terminal of potentiometer 36, thus increasing the voltage at the (+) terminal of amplifier 102. The increased voltage at the (+) terminal of amplifier 102 causes a voltage differential between its (+) and (−) inputs and thus raises the voltage Vo at terminal 81. The increase in voltage Vo is communicated to the (−) input of amplifier 106 via resistor R4, thus lowering the voltage Vo' at terminal 83. Since the voltage Vo at terminal 81 is higher than voltage Vo' at terminal 83, a large current flows through servo motor 82. The current through servo motor 82 rotates the servo motor 82 and the camera 56 to the right, viewing FIG. 1. The shaft 88 of potentiometer 86 rotates along with the camera 56 and causes the voltage V− at the (−) input of amplifier 102 to increase, thereby decreasing the voltage differential between the (+) and (−) inputs of amplifier 102.

When parallel alignment between the aiming direction of the camera 56 and the longitudinal axis of the tractor has been reattained, the angular positions of the shaft 88 of potentiometer 86 and of the shaft 40 of potentiometer 36 will again be adjusted so that the voltages at their tap terminals will be once again equalized. The equalization of the tap voltages eliminates the voltage differential between the (+) and (−) terminals of amplifier 102, and returns voltage Vo to its original +V/2 level at terminal 81. This causes the voltage V− at the (−) input of amp 106 to return to its original +V/2 level and eliminates the voltage differential at the inputs of amplifier 106. Amplifier 106 responds by returning voltage Vo' back to +V/2 at terminal 83. At this point, the voltage at terminals 81 and 83 is again equalized, and current ceases to flow through servo motor 82. With no current flowing through servo motor 82, further rotation of the camera 56 is prevented and the camera 56 is maintained in parallel alignment with the longitudinal axis of the tractor 10, as desired.

The abrupt reduction of current through the inductance L of motor 82 tends to cause a voltage surge at terminals 81 and 83, due to the well-known L(di/dt) effect. The circuit may be protected from these voltage surges by providing a current path from the motor 82 to ground via zener diodes (not shown) which have a breakdown characteristic at the maximum voltage to which the circuit is to be subjected. The circuit 100 operates in a similar manner in response to a left-hand turn, except that the current flows through the servo motor 82 in the opposite direction and rotates camera 56 to the left.

It should be noted that the differential operational amplifier 102 is sensative to the difference between the voltages V+ and V− at its (+) and (−) inputs, respectively. In a steady state situation, where no steering changes occur, voltages V+ and V− are equal and the difference therebetween is zero. If the magnitude of the supply voltage +V varies during this steady state condition, then both voltage V+ and V− will change by an equivalent amount due to the indentical nature of potentiometers 36 and 86. The difference between V+ and V− remains zero despite changes in the supply voltage +V, and thus, the circuit 100 is immune from supply voltage variations.

We claim:

1. A guidance aid for assisting an operator in guiding a motorized vehicle pulling an implement pivotally attached thereto for movement about a vertically extending pivot axis, the guidance aid comprising:
- means attached to the implement for creating a mark in a terrain surface;
- a video camera pivotally mounted on the implement for converting an image of the mark to electrical image signals indicative thereof;
- display means mounted on the vehicle and coupled to the camera for displaying to the operator an image corresponding to the electrical image signals; and
- control means for automatically aiming the camera in a fixed predetermined direction with respect to the vehicle.

2. The guidance aid of claim 1, wherein the control means comprises:
- implement angle sensor means for generating implement angle signals representing an angle between the vehicle and the implement;
- circuit means for generating control signals as a function of the implement angle signals; and
- servo means coupled to the circuit means, to the implement, and to the camera for rotating the camera with respect to the implement in response to the control signals.

3. The guidance aid of claim 1, wherein the control means comprises:
- implement angle sensing means for generating implement angle signals representing an angle between the vehicle and the implement;
- camera angle sensing means for generating camera angle signals representing an angle between the camera and the implement;
- circuit means for comparing the implement and camera angle signals and for generating an error signal as a function thereof; and
- servo means responsive to the error signals for rotating the camera relative to the implement to reduce the magnitude of the error signals.

4. The guidance aid of claim 2, wherein:
- the vehicle includes a drawbar member extending therefrom, the implement including a hitch member extending therefrom for coupling to the drawbar member and for pivoting relative thereto about a coupling axis; and
- the implement angle sensing means comprises a housing fixed to one of the drawbar and hitch members, a shaft mounted for rotation with respect to the housing, means interconnecting the shaft and the other of the drawbar and hitch members to rotate the shaft in response to pivoting of the hitch member relative to the drawbar member, and means for generating the implement angle signals as a function of an angular position of the shaft relative to the housing.

5. The guidance aid of claim 4, wherein:
- the interconnecting means comprises an arm extending radially from the shaft and a resilient member with one end connected to an outer end of the arm and with an opposite end connected to the other of the drawbar and hitch members.

6. The guidance aid of claim 4, wherein:
- the shaft of the implement angle sensing means has an axis of rotation colinear with the coupling axis.

7. A guidance aid system for assisting an operator in guiding a vehicle pulling an implement pivotally attached thereto, the guidance aid system comprising:
- marker means attached to the implement for creating a mark in the terrain;
- a video camera pivotally mounted on the implement for converting an image of the mark to electrical image signals indicative thereof;
- control means for aiming the camera in a first predetermined direction with respect to the vehicle, the control means comprising implement angle sensing means for generating an implement angle signal representing an angle between the vehicle and the implement, circuit means for generating control signals as a function of the implement angle signals and servo means responsive to the control signals for rotating the camera relative to the implement; and
- display means mounted on the vehicle and coupled to the camera for displaying to the operator an image corresponding to the electrical image signals.

8. The guidance aid system of claim 7, wherein:
- the vehicle includes a drawbar member extending therefrom, the implement including a hitch member extending therefrom for coupling to the drawbar member and for pivoting relative thereto about a coupling axis; and
- the implement angle sensing means comprises a housing fixed to one of the drawbar and hitch members, a shaft mounted for rotation with respect to the housing means interconnecting the shaft with the other of the drawbar and hitch members to rotate the shaft in response to pivoting of the hitch member relative to the drawbar member, and means for generating the implement angle signals as a function of an angular position of the shaft relative to the housing.

9. The guidance aid system of claim 8, wherein:
- the interconnecting means comprises an arm extending radially from the shaft and a resilient member with one end connected to an outer end of the arm and with an opposite end connected to the other of the drawbar and hitch members.

10. The guidance aid system of claim 8, wherein:
- the shaft of the implement angle sensing means has an axis of rotation colinear with the coupling axis.

11. A guidance aid system for assisting an operator in guiding a vehicle pulling an implement pivotally attached thereto, the guidance aid system comprising:
- marker means attached to the implement for creating an mark in the terrain;
- video camera pivotally mounted on the implement for converting an image of the mark to electrical image signals;
- control means for aiming the camera in a fixed predetermined direction with respect to the vehicle, the control means comprising implement angle sensing means for generating an implement angle signal representing an angle between the vehicle and the implement, camera angle sensing means for generating a camera angle signal representing an angle between the camera and the implement, circuit means for comparing the implement and camera angle signals and for generating an error signal representing the difference therebetween and servo means responsive to the error signals for rotating the camera relative to the implement to reduce the magnitude of the error signal; and
- display means mounted on the vehicle and coupled to the camera for displaying to the operator an image corresponding to the electrical image signals.

12. The guidance aid system of claim 11, wherein:

the vehicle includes a drawbar member extending therefrom, the implement including a hitch member extending therefrom for coupling to the drawbar member and for pivoting relative thereto about a coupling axis; and the implement angle sensing means comprising a housing fixed to one of the drawbar and hitch members, a shaft mounted for rotation with respect to the housing, means for interconnecting the shaft and the other of the drawbar and hitch members, and means for generating the implement angle signals as a function of an angular position of the shaft relative to the housing.

13. The guidance aid system of claim 12, wherein:
the interconnecting means comprises an arm extending radially from the shaft and a resilient member with one end connected to an outer end of the arm and with an opposite end connected to the other of the drawbar and hitch members.

14. The guidance aid system of claim 12, wherein:
the implement angle sensing means shaft has an axis of rotation colinear with the coupling axis.

15. A guidance aid for assisting an operator in guiding a vehicle with a towed implement pivotally attached thereto, the guidance aid comprising:
marker means projecting from the implement for creating a mark in the terrain;
a video camera means pivotally attached to the implement for converting an image of the mark to electrical image signals;
display means mounted on the vehicle and connected to the camera for displaying to the vehicle operator an image corresponding to electrical image signals;
first angle sensing means for sensing a relative angle between the vehicle and the implement and for generating an implement angle signal corresponding thereto;
circuit means coupled with the angle sensing means for generating a control signal as a function of the implement angle signal; and
servo means connected to the camera for pivoting the camera in response to the control signal.

16. The guidance aid of claim 15, further comprising:
second angle sensing means for detecting an angle between the camera and the implement and for generating a feedback angle signal corresponding thereto, the control means generating an error control signal as a function of the implement and feedback angle signals.

17. The guidance aid of claim 16, wherein the circuit means comprises:
comparator means for receiving the implement and feedback angle signals and for generating a differential signal representing the difference therebetween; and
amplifier means for generating the error control signal in response to the differential signal.

18. A guidance aid for assisting an operator to guide a vehicle towing an implement pivotally coupled thereto about a vertically extending coupling axis, the guidance aid comprising:
a video camera mounted on the implement for converting an image of a mark created in terrain to electrical image signals;
display means mounted on the vehicle for displaying to the operator an image corresponding to the electrical image signals;
pivot means for pivotally mounting the camera on the implement; and
control means for automatically rotating the camera relative to the implement and for automatically maintaining aiming of the camera in a direction parallel to a longitudinal axis of the vehicle.

19. A guidance aid for assisting an operator in guiding a motorized vehicle pulling an implement pivotally attached thereto, the guidance aid comprising:
means attached to the implement for creating a mark in a terrain surface;
a video camera pivotally mounted on the implement for converting an image of the mark to electrical image signals indicative thereof;
display means mounted on the vehicle and coupled to the camera for displaying to the operator an image corresponding to the electrical image signals; and
control means for aiming the camera in a fixed predetermined direction with respect to the vehicle, the control means comprising implement angle sensor means for generating implement angle signals representing an angle between the vehicle and the implement, circuit means for generating control signals as a function of the implement angle signals, and servo means coupled to the circuit means, to the implement, and to the camera for rotating the camera with respect to the implement in response to the control signals.

20. A guidance aid for assisting an operator in guiding a motorized vehicle pulling an implement pivotally attached thereto, the guidance aid comprising:
means attached to the implement for creating a mark in a terrain surface;
a video camera pivotally mounted on the implement for converting an image of the mark to electrical image signals indicative thereof;
display means mounted on the vehicle and coupled to the camera for displaying to the operator an image corresponding to the electrical image signals; and
control means for aiming the camera in a first predetermined direction with respect to the vehicle, the control means comprising implement angle sensing means for generating implement angle signals representing an angle between the vehicle and the implement, camera angle sensing means for generating camera angle signals representing an angle between the camera and the implement, circuit means for comparing the implement and camera angle signals and for generating an error signal as a function thereof, and servo means responsive to the error signals for rotating the camera relative to the implement to reduce the magnitude of the error signals.

* * * * *

UNITED STATES PATENT AND TRADEMARK OFFICE
CERTIFICATE OF CORRECTION

PATENT NO. : 4,365,268

DATED : 21 December 1982

INVENTOR(S) : David T. Allen; Keith R. Baker

It is certified that error appears in the above-identified patent and that said Letters Patent is hereby corrected as shown below:

Column 6, line 4, delete "first" and insert -- fixed --;

Column 8, line 48, delete "first" and insert -- fixed --.

*Signed and Sealed this*

*Twenty-fourth* Day of *January 1984*

[SEAL]

Attest:

GERALD J. MOSSINGHOFF

*Attesting Officer*   *Commissioner of Patents and Trademarks*